US008862908B2

(12) United States Patent
Inokuchi et al.

(10) Patent No.: US 8,862,908 B2
(45) Date of Patent: Oct. 14, 2014

(54) INFORMATION PROCESSING APPARATUS, POWER SOURCE CONTROL METHOD THEREOF, PROGRAM THEREOF, AND STORAGE THEREOF (75) Inventors: Sumihiro Inokuchi, Kanagawa (JP); Mitsufumi Yamamoto, Kanagawa (JP); Shugo Okamura, Tokyo (JP); Toyokazu Aoki, Tokyo (JP); Takumi Kawamura, Kanagawa (JP); Kouji Yamanobe, Kanagawa (JP); Norio Muraishi, Tokyo (JP); Kazuyuki Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 698 days.

(21) Appl. No.: 13/168,386

(22) Filed: Jun. 24, 2011

(65) Prior Publication Data

US 2011/0320831 A1 Dec. 29, 2011

(30) Foreign Application Priority Data

Jun. 28, 2010 (JP) ................................. 2010-146116

(51) Int. Cl.
*G06K 7/10* (2006.01)
*G06F 1/30* (2006.01)
(52) U.S. Cl.
CPC .............. *G06F 1/30* (2013.01); *G06K 7/10207* (2013.01)
USPC .......................................... 713/300; 710/302
(58) Field of Classification Search
USPC ......... 713/1, 2, 100, 300, 310, 320, 321, 322, 713/323, 324, 330, 340, 375, 31
See application file for complete search history.

(56) References Cited

U.S. PATENT DOCUMENTS

| 4,868,832 | A  | * | 9/1989  | Marrington et al. | ............. | 714/22  |
| 6,816,936 | B1 | * | 11/2004 | Wu et al.         | ........................ | 710/302 |
| 2006/0157772 | A1 | * | 7/2006  | Sumida et al.  | ................ | 257/314 |
| 2008/0155294 | A1 | * | 6/2008  | Kikuchi et al. | ............... | 713/340 |
| 2009/0066987 | A1 |   | 3/2009  | Inokuchi       |                |         |

FOREIGN PATENT DOCUMENTS

| JP | 11-175411 | 7/1999 |
| JP | 2003-224677 | 8/2003 |
| JP | 2006-85038 | 3/2006 |

* cited by examiner

*Primary Examiner* — Stefan Stoynov
*Assistant Examiner* — Paul J Yen
(74) *Attorney, Agent, or Firm* — Oblon, Spivak, McClelland, Maier & Neustadt, L.L.P.

(57) ABSTRACT

An information processing apparatus includes an information storage to store information indicating a state of the information processing apparatus; an information writing processor to write the information to the information storage; a main power source and an auxiliary power source to supply power to the information writing processor; and a discharge controller to control a discharge speed of the auxiliary power source. When a voltage output of the main power source becomes a reference voltage, the discharge controller switches a power source for the information writing processor from the main power source to the auxiliary power source, and then after completing information writing to the information storage by using the information writing processor and the auxiliary power source, the discharge controller controls the discharge speed of the auxiliary power source to decrease a voltage output of the auxiliary power source to a given voltage within a given time period.

12 Claims, 9 Drawing Sheets

INFORMATION PROCESSING APPARATUS, POWER SOURCE CONTROL METHOD THEREOF, PROGRAM THEREOF, AND STORAGE THEREOF

CROSS-REFERENCE TO RELATED APPLICATIONS

This application claims priority to Japanese Patent Application No. 2010-146116, filed on Jun. 28, 2010 in the Japan Patent Office, which is incorporated by reference herein in its entirety.

BACKGROUND OF THE INVENTION

1. Field of the Invention

The present invention relates to an information processing such as image forming apparatus having a data writing function to a non-volatile memory such as an integrated circuit (IC) tag, and a method of controlling a power source of the information processing apparatus.

2. Description of the Background Art

Information processing apparatuses such as image forming apparatuses have been equipped with enhanced machine information service for maintenance service of machines and/or enhanced information providing service to machine users, by which service engineers and/or users can obtain and utilize settings information related to machines and/or use-state information of consumables. Such information can be obtained from, for example, a non-volatile memory such as an integrated circuit (IC) tag provided for each of machines as disclosed in JP-2003-224677-A.

The IC tag is generally an IC chip, which includes a memory to store information, a control circuit to read and write information for the memory, and a communication circuit to conduct wireless or wired communication with other devices. For example, the IC tag may be attached to individual toner bottles, storing color agents used for printing such as pigment-based toner, which are detachably installed in an image forming apparatus, in which data such as information of remaining toner amount can be written to and/or read from the memories of the IC tags. The memories used for the IC tags generally employ a rewritable non-volatile memory that can retain or store information even when a power supply of the IC tag is turned OFF state, and such memory may be, for example, an electrically erasable programmable read-only memory (EEPROM) or the like.

The IC tag attached to consumables such as toner bottles can be re-used in various ways. For example, an IC tag attached to a toner bottle may be re-used with the toner bottle which is refilled with fresh toner, or removed from a toner-consumed bottle and attached to a new toner bottle filled with fresh toner. However, there is an upper limit to the number of times the memory can be rewritten, because memory elements in non-volatile memories used for IC tags deteriorate by repeating the refreshing process.

In view of such drawback, the number of times that the IC tags can be re-used can be increased by decreasing the number of times data is written to the non-volatile memories in the IC tags. For example, the number of times data is written to the non-volatile memories can be decreased by writing data to the non-volatile memory only when an image forming apparatus is in a state of power OFF and/or toner replacement, that is, not updating toner information in the non-volatile memories at a given periodical timing such as when a given number of sheets are printed.

Specifically, toner information stored in the non-volatile memory can be temporarily stored in random access memories (RAM) installed in image forming apparatuses. When the image forming apparatuses are in operation, toner information stored in the RAMS can be updated as required. Then, only when the image forming apparatuses are set to the power OFF and/or toner replacement, the information stored in the RAMs is written in the non-volatile memories of the IC tags.

Such a method of writing information to the non-volatile memories of the IC tags when image forming apparatuses are set to the power OFF state is disclosed in JP-H11-175411-A. Specifically, a high-capacitance capacitor having a greater capacitance is disposed on a power source line for supplying power to an electrical circuit required for writing information to an IC tag, and a switch is disposed between the capacitor and an internal power source. When the image forming apparatus is set to the power OFF state, the switch is set to the OFF state. As such, the capacitor, which has a capacitance sufficient to function as an auxiliary power source, is provided. The switch is set at the OFF state when the voltage of internal power source becomes low, in which case the voltage of capacitor is applied only to the electrical circuit required for writing information to the IC tag. With such a configuration, a time for writing information to the non-volatile memory in the IC tag can be secured by extending the duration of the fall time of the terminal voltage of capacitor.

However, such integrated circuits generally have an upper limit for fall time of the power voltage supplied to the ICs when the power OFF state is set for the image forming apparatus. As such, although the ICs may be configured to be operated properly when the power voltage supplied to the ICs decreases to a given value within the upper limit for the fall time of the power voltage, if the actual fall time of the power voltage of the ICs exceeds the upper limit of the fall time, the IC tags using such ICs may malfunction.

SUMMARY

In one aspect of the present invention, an information processing apparatus is devised. The information processing apparatus includes an information storage to store information indicating a state of the information processing apparatus; an information writing processor to write the information, indicating the state of the information processing apparatus, to the information storage; a main power source to supply power to the information writing processor; an auxiliary power source to supply power to the information writing processor; and a discharge controller to control a discharge speed of the auxiliary power source. When a voltage output of the main power source becomes a preset reference voltage value, the discharge controller switches a power source for supplying power to the information writing processor from the main power source to the auxiliary power source, and then after completing information writing to the information storage by using the information writing processor and the auxiliary power source, the discharge controller controls the discharge speed of the auxiliary power source to decrease a voltage output of the auxiliary power source to a given voltage within a given time period.

In another aspect of the present invention, a method of controlling a power supply for an information processing apparatus employing a main power source and an auxiliary power source is devised. The method includes the steps of: writing information indicating a state of the information processing apparatus to an information storage for the information processing apparatus; detecting a voltage output of the main power source supplying power for the writing of the information; and controlling a discharge speed of the auxiliary power source supplying power for the writing of the information. When the voltage output of the main power source becomes a preset reference voltage value, the controlling step switches a power source for supplying power to the writing step from the main power source to the auxiliary power source, and then after completing the writing step using the auxiliary power source, the controlling step controls the discharge speed of the auxiliary power source to decrease a voltage output of the auxiliary power source to a given voltage within a given time period.

In another aspect of the present invention, a computer-readable medium storing a program comprising instructions that when executed by a computer cause the computer to execute a method of controlling a power supply for an information processing apparatus employing a main power source and an auxiliary power source by executing the program is devised. The method includes the steps of: writing information indicating a state of the information processing apparatus to an information storage for the information processing apparatus; detecting a voltage output of the main power source supplying power for the writing of the information; and controlling a discharge speed of the auxiliary power source supplying power for the writing of the information. When the voltage output of the main power source becomes a preset reference voltage value, the controlling step switches a power source for supplying power to the writing step from the main power source to the auxiliary power source, and then after completing the writing step using the auxiliary power source, the controlling step controls the discharge speed of the auxiliary power source to decrease a voltage output of the auxiliary power source to a given voltage within a given time period.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result.

Referring now to the drawings, an information processing apparatus according to example embodiment is described hereinafter.

First Example Embodiment

Figure 1:
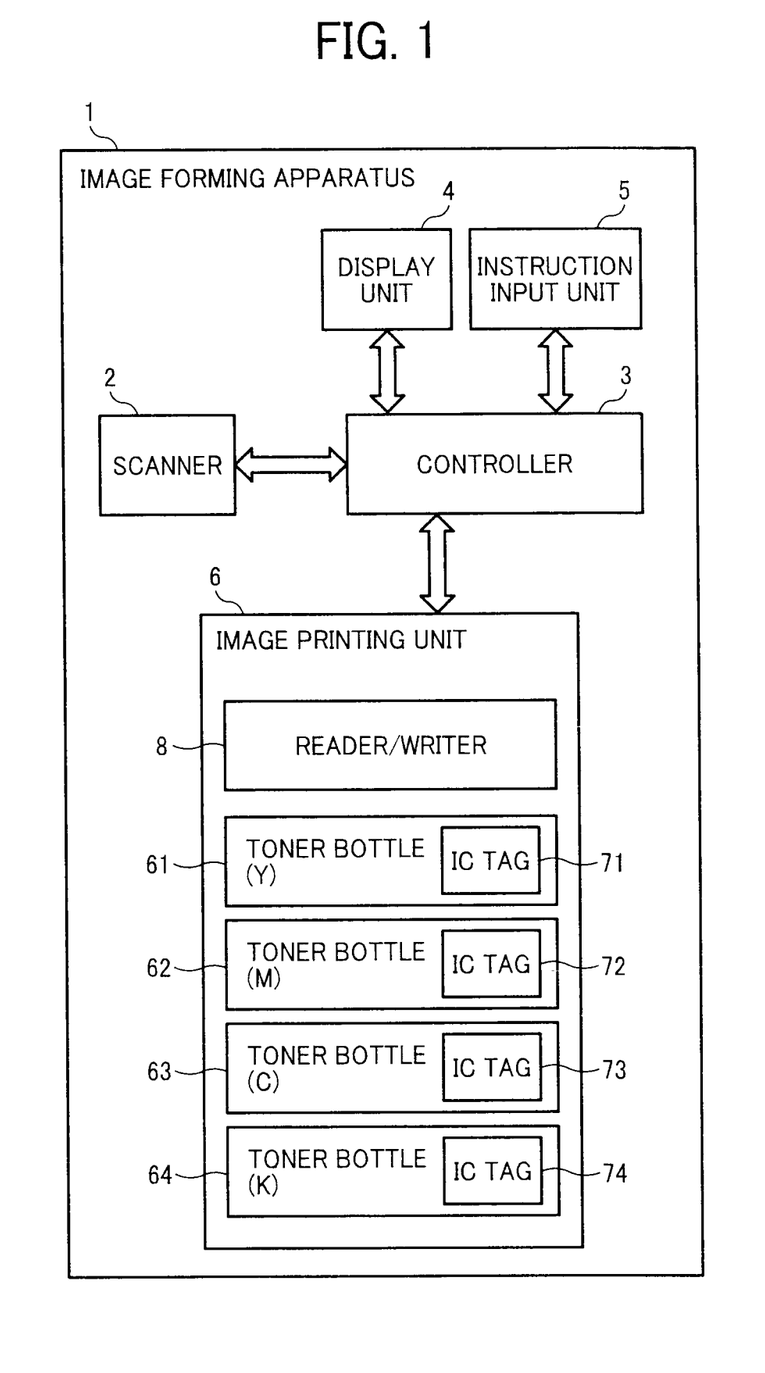
FIG. 1 shows an example block diagram of an image forming apparatus according to a first example embodiment.

FIG. 1 shows an example block diagram of an image forming apparatus 1 according to a first example embodiment, in which the image forming apparatus 1 is described as one example of information processing apparatuses. Hereinafter, information or data processing for the image forming apparatus 1 is described. However, it should be noted that the following example embodiments for processing information or data can be applied to various types of information processing apparatuses, not limited to the image forming apparatuses such as printers, copiers, etc. The image forming apparatus 1 may include a scanner 2, a controller 3, a display unit 4, an instruction input unit 5, and an image printing unit 6.

The scanner 2 scans document image, and converts image to electrical signals to output and image data. As such, the scanner 2 is used as an image scanning unit. The controller 3 processes the image data output from the scanner 2, and controls each unit in the image forming apparatus 1. The display unit 4 displays the image scanned by the scanner 2.

The instruction input unit 5 is used to input instruction by a user. The display unit 4 and the instruction input unit 5 may be devised as an operation panel such a liquid crystal display (LCD) panel, a monitor panel disposed with operation keys such as touch keys, hard keys, or the like. The image printing unit 6 prints the image, scanned by the scanner 2 and processed by the controller 3 as image data. As such, the image printing unit 6 is used as an image printing unit.

Further, the image printing unit 6 may include toner bottles 61, 62, 63, 64, and a reader/writer 8. The toner bottles 61, 62, 63, 64 store different color agent used for printing such as toner having pigments, and each of the toner bottles 61, 62, 63, 64 is respectively attached with integrated circuit (IC) tags 71, 72, 73, 74. The reader/writer 8 is used for data or information writing and reading with the IC tags 71, 72, 73, 74. The IC tag is used as an information storage, which may be referred to as a memory, and more particularly to as a rewritable non-volatile memory that can rewrite data, and retain or store data even when a power supply to the memory is turned OFF, and such memory is, for example, an electrically erasable programmable read-only memory (EEPROM) or the like, but not limited thereto.

Further, (Y), (M), (C), and (K) attached to the toner bottles 61, 62, 63, 64 shown in FIG. 1 indicate that the toner bottles 61, 62, 63, 64 may respectively store color agent of yellow (Y), magenta (M), cyan (C), black (K). Further, the IC tags 71, 72, 73, 74 can store toner information of respective toner bottles 61, 62, 63, 64 such as toner color, remaining toner amount, or the like, but not limited thereto.

Figure 2A:
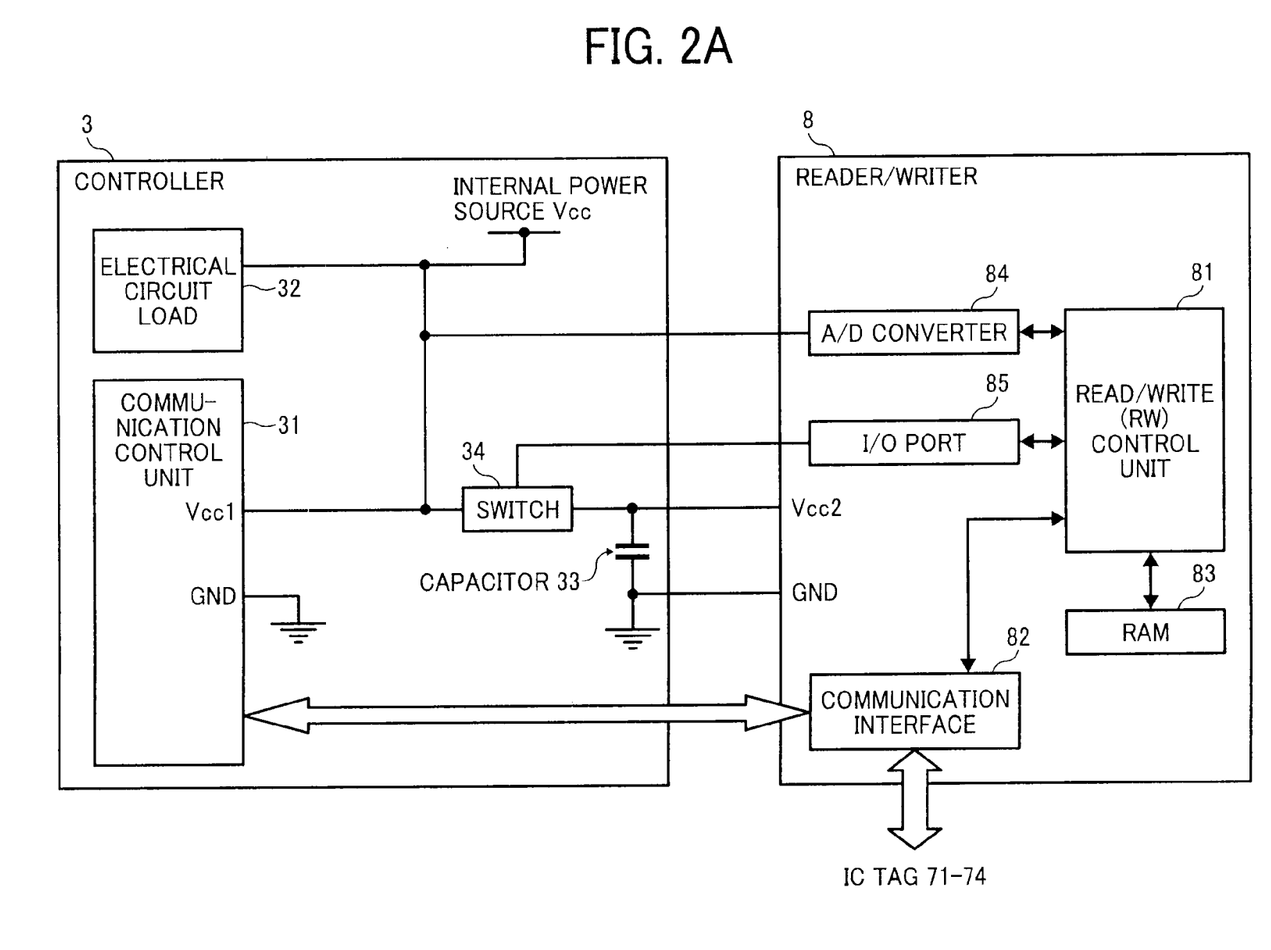
FIG. 2A shows an example block diagram of control system and reader/writer employed for the image forming apparatus according to the first example embodiment.

FIG. 2A shows an example block diagram of the controller 3 and the reader/writer 8 of the image printing unit 6, disposed for the image forming apparatus 1. The controller 3 includes a plurality of electrical circuits such as a communication control unit 31 (or communication controller 31) and an electrical circuit load 32, a switch 34, and a capacitor 33. The switch 34 may be referred to as the first switch 34, hereinafter. The communication control unit 31 is used to transmit and receive data between the controller 3 and the reader/writer 8. The communication control unit 31 (or communication controller 31) can be configured with various types of processor, circuit, or the like such as a programmed processor, a circuit, an application specific integrated circuit (ASIC), used singly or in combination. The electrical circuit load 32 may be one or more electrical circuits used in the controller 3, such as a drive circuit to drive a motor for driving a mechanical device such as a roller, which is other than the communication control unit 31. The first switch 34 can be used to control an electric current supply to a power terminal Vcc2 of the reader/writer 8. The switch in this disclosure is a switching device, which may be a transistor such as a field effect transistor (FET), but not limited thereto. The capacitor 33, connected to the reader/writer 8 in parallel to the power terminal Vcc2, may be used as an auxiliary power source. As shown in FIG. 2A, an internal power source Vcc, which may be used as a main power source, can supply power, for example, to the communication control unit 31 and the electrical circuit load 32 in the controller 3, and the reader/writer 8, or the like. The IC tags 71, 72, 73, 74 may be operated using a battery or a cell installed in the IC tag.

The internal power source Vcc is set to the OFF state under a given state. For example, when a user sets the power supply to the image forming apparatus 1 at the OFF state, or when an interlock switch detects an open state of a housing door of the image forming apparatus 1, in which the housing door of the image forming apparatus 1 is opened to replace at least one of the toner bottles 61, 62, 63, 64 and then a power supply switch for the image forming apparatus 1 is set to the OFF state.

Further, the internal power source Vcc may be a power source, which may be generated by rectifying an alternating current supplied to the image forming apparatus 1 and decreasing the rectified voltage, or the internal power source Vcc may be other power source disposed separately.

The reader/writer 8 may include a read/write (RW) control unit 81 (or RW controller 81), a communication interface 82, a random access memory (RAM) 83, an analog/digital (A/D) converter 84, and a input/output (I/O) port 85. The input/output (I/O) port 85 may be referred to as the first I/O port 85, hereinafter.

The RW control unit 81 controls processes for the reader/writer 8. The RW control unit 81 can be configured with various types of processor, circuit, or the like such as a programmed processor, a circuit, an application specific integrated circuit (ASIC), or the like used singly or in combination thereof. The communication interface 82 is used to communicate information between the RW control unit 81 and the communication control unit 31, and to communicate information between the RW control unit 81 and the IC tags 71, 72, 73, 74. The communication control unit 31 can be used as a transmission unit to transmit information to the RW control unit 81, which can be used as an information writing processor. For example, the communication control unit 31 transmits information indicating states of the image forming apparatus 1 to the RW control unit 81.

The RAM 83 is a memory that temporarily stores state information (e.g., settings information, use-state information of consumables) of the image forming apparatus 1, which can be also stored in the IC tags 71, 72, 73, 74, and updates such information based on information or data transmitted from the communication control unit 31 of the controller 3. The RAM 83 may be a static RAM (SRAM), a dynamic RAM (DRAM), or the like, but not limited these.

The A/D converter 84 converts a voltage input from an external device, which is a voltage of the internal power source Vcc, to a digital value. The first I/O port 85 is connected to the first switch 34 of the controller 3 to control the operation of the first switch 34.

The first switch 34 may be a normally-ON type switch, which means the first switch 34 is at the ON state when the electric current is not supplied from the first I/O port 85, and the first switch 34 is at the OFF state when the electric current is supplied from the first I/O port 85. Further, the RW control unit 81 may be a computer including a central processing unit (CPU), a read only memory (ROM) written with programs, a random access memory (RAM) to store data temporarily, and so on.

The IC tags 71, 72, 73, 74 may be used as an information storage to store information indicating states of the image forming apparatus 1. The RW control unit 81, used as the information writing processor, writes information indicating states of the image forming apparatus 1 to the IC tags 71, 72, 73, 74. The capacitor 33 can be used as an auxiliary power source to supply power to the RW control unit 81 (information writing processor) when the internal power source Vcc (main power source) of the image forming apparatus 1 is set at the OFF state.

Further, the first switch 34, the first I/O port 85, and the RW control unit 81 can be configured as a discharge controller to control a discharge speed of electric current discharged from the capacitor 33, useable as the auxiliary power source.

Further, the A/D converter 84 and the RW control unit 81 may be configured as a power source voltage detector to detect the voltage of the internal power source Vcc, supplied for the image forming apparatus 1.

Further, the reader/writer 8 is set with an upper limit of fall time for the voltage applied to the power terminal Vcc2 of the reader/writer 8 in a state of power OFF of the image forming apparatus 1 to prevent erroneous operation by the reader/writer 8, which means the voltage applied to the power terminal Vcc2 of the reader/writer 8 needs to be decreased to a given voltage such that the reader/writer 8 stops operation within a given time period, which is a time shorter than a time that the reader/writer 8 starts to operate erroneously.

As described above, the IC tags 71, 72, 73, 74 may be operated using the battery or cell installed in the IC tag. However, the IC tags 71, 72, 73, 74 can also be configured differently. For example, the power terminals of the IC tags 71, 72, 73, 74 can be connected in parallel to the power terminal Vcc2 of the reader/writer 8, so that power can be supplied to the IC tags 71, 72, 73, 74 from the internal power source Vcc and the capacitor 33 similar to the reader/writer 8. Further, the IC tags 71, 72, 73, 74 can be configured as radio frequency identification (RFID) tags, which include a wireless communication circuit and an antenna for writing/reading information or data by wireless communication, in which a carrier wave received by the antenna is rectified to generate power. In this case, the reader/writer 8 may have a wireless communication circuit and an antenna to conduct wireless communication with the RFID.

Under the above configuration for the controller 3 and the reader/writer 8, when a user turns on the power to the image forming apparatus 1, the voltage of internal power source Vcc is gradually increased to a normal rating voltage V1, and then the image forming apparatus 1 starts to operate. Further, when the user turns the power supply to the image forming apparatus 1 off, the voltage of internal power source Vcc is decreased, and the reader/writer 8 detects such voltage decrease of the internal power source Vcc. Upon detecting the voltage decrease of the internal power source Vcc, the reader/writer 8 sets the first switch 34 at the OFF state to reduce the discharge speed of the capacitor 33, by which the decreasing rate of the voltage applied to the power terminal Vcc2 of the reader/writer 8 can be minimized. With such a configuration, the reader/writer 8 can be operated after the power supply for the image forming apparatus 1 is set at the OFF state, and can conduct data writing to the IC tags 71, 72, 73, 74 during such period that the decreasing rate of the voltage applied to the power terminal Vcc2 of the reader/writer 8 is minimized.

Further, upon completing the data writing to the IC tags 71, 72, 73, 74, the reader/writer 8 sets the first switch 34 at the ON state to increase the discharge speed of the capacitor 33 and the decreasing rate of the terminal voltage of the capacitor 33. With such a configuration, the voltage applied to the power terminal Vcc2 of the reader/writer 8, connected to the capacitor 33, can be decreased to a given voltage to stop the operation of the reader/writer 8 within a time shorter than a time at which that the reader/writer 8 starts to operate erroneously. As such, the reader/writer 8 can stop operation without causing a malfunction in a state of power OFF of the image forming apparatus 1.

As above described, even after the power source for the image forming apparatus 1 is shutdown, the ON/OFF state of the first switch 34 can be controlled using the capacitor 33 (auxiliary power source), by which a change of power supply to the reader/writer 8 can be controlled, and an error processing of the reader/writer 8 can be prevented when data writing operation to the IC tags 71, 72, 73, 74 is conducted after the power source for the image forming apparatus 1 is shutdown.

Figure 3:
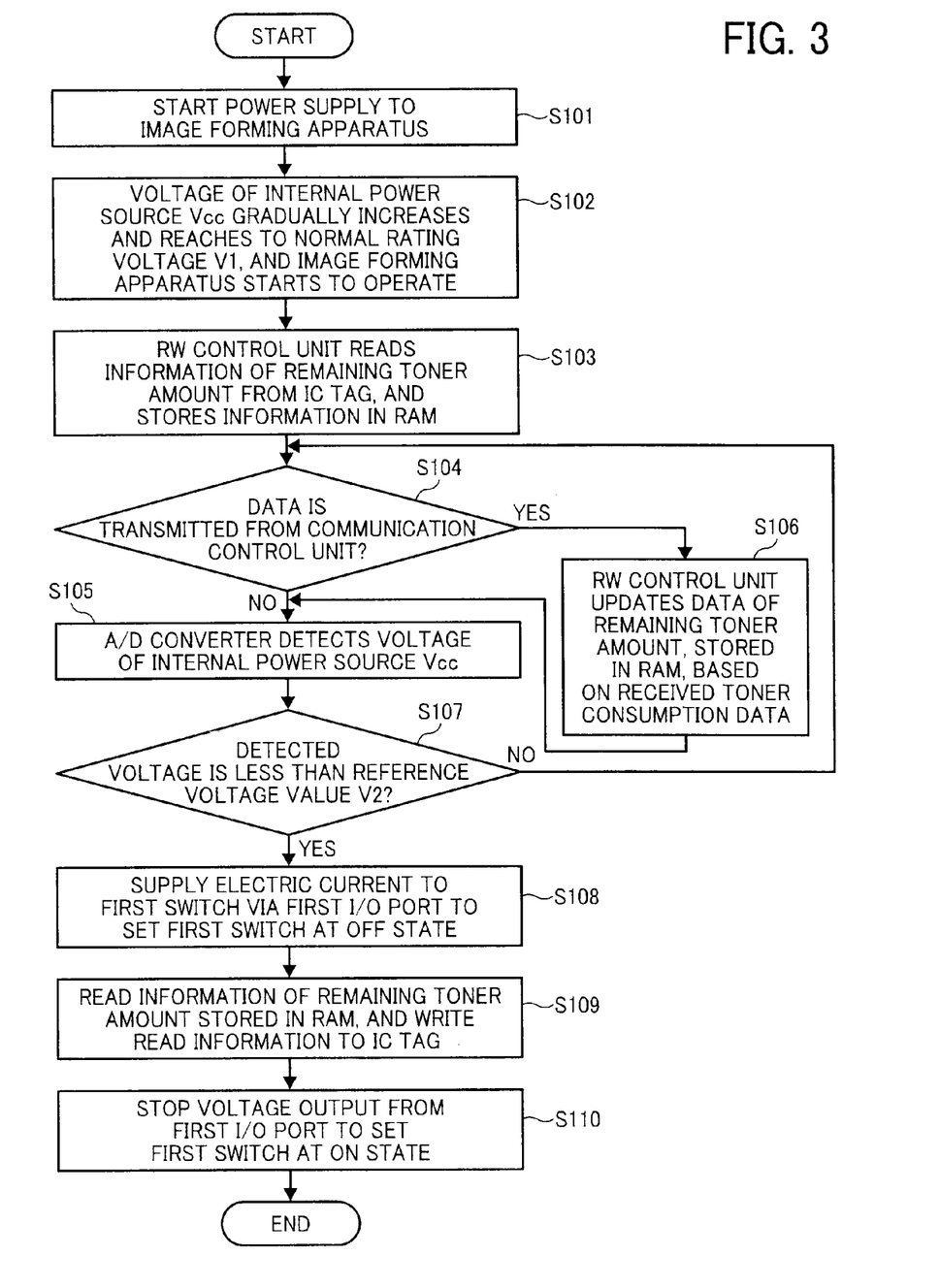
FIG. 3 shows a flowchart of reader/writer operation of the image forming apparatus according to the first example embodiment.

A description is given of an operation of the reader/writer 8 of the image forming apparatus 1 with reference to FIG. 3, which shows a flowchart of operation of the reader/writer 8.

At first, the power is supplied to the image forming apparatus 1, for example, when a user sets the power ON for the image forming apparatus 1 (step S101). The voltage of internal power source Vcc gradually increases and reaches to the normal rating voltage V1, and the image forming apparatus 1 starts to operate (step S102), in which the first switch 34, which is a normally-ON type switch, is set at the ON state because the electric current is not supplied from the first I/O port 85 of the reader/writer 8. Accordingly, when the image forming apparatus 1 is conducting a normal operation, the internal power source Vcc can be supplied to the power terminal Vcc2 of the reader/writer 8.

When the power is supplied from the internal power source Vcc to the power source terminal Vcc2, the RW control unit 81 of the reader/writer 8 reads information such as, for example, information of toner amount remaining in the tonner bottles from the IC tags 71, 72, 73, 74 via the communication interface 82, and stores the read information in the RAM 83 (step S103).

Then, the RW control unit 81 determines whether information indicating states of the image forming apparatus 1 such as toner consumption data of the toner bottles 61, 62, 63, 64 is transmitted from the communication control unit 31 via the communication interface 82 (step S104). If it is determined that the information indicating states of the image forming apparatus 1 is not transmitted from the communication control unit 31 (step S104: No), the process goes to step S105, in which the A/D converter 84 detects the voltage of the internal power source Vcc (step S105).

If it is determined that the information indicating states of the image forming apparatus 1 such as toner consumption data is transmitted from the communication control unit 31 (step S104: Yes), the RW control unit 81 updates data of toner amount remaining in at least one of the toner bottles 61, 62, 63, 64 stored in the RAM 83 based on the received toner consumption data (step S106), and then the process goes to step S105.

Upon detecting the voltage of the internal power source Vcc at step S105, the RW control unit 81 determines whether the detected voltage is less than a given threshold voltage such as a reference voltage value V2, set in advance, at step S107, in which it is determined whether the voltage of the internal power source Vcc is decreased to the reference voltage value V2.

If the detected voltage is less than the reference voltage value V2 (step S107: Yes), the RW control unit 81 supplies electric current to the first switch 34 using the first I/O port 85, by which the first switch 34 can be set at the OFF state (step S108). By setting the first switch 34 at the OFF state, the charges accumulated in the capacitor 33 can be discharged only to the reader/writer 8, in which an electric current supply from the capacitor 33 (auxiliary power source) to other electrical circuits can be stopped, by which the discharge speed of the capacitor 33 can be suppressed or reduced, and thereby the decreasing rate of the terminal voltage of the capacitor 33 becomes slow compared to a configuration not disposed with the first switch 34.

Accordingly, during a time period that the voltage applied to the power terminal Vcc2 of the reader/writer 8 is maintained at an operation guarantee voltage V3 or more, the RW control unit 81 reads information indicating current state of the image forming apparatus 1 such as, for example, information of remaining toner amount stored in the RAM 83, and writes the read information to the IC tags 71, 72, 73, 74 (step S109).

Upon completing the data writing to the IC tags 71, 72, 73, 74, the RW control unit 81 stops the voltage output from the first I/O port 85 and sets the first switch 34 at the ON state (step S110), by which the charges of the capacitor 33 (auxiliary power source) can be discharged (or supplied) to the communication control unit 31 and other units such as electrical circuit load 32, and thereby the discharge speed of the capacitor 33 can be increased. Resultantly, the terminal voltage of the capacitor 33 can be decreased rapidly compared to when the first switch 34 is at the OFF state, and the voltage applied to the power terminal Vcc2 of the reader/writer 8 can be also rapidly decreased to a given voltage that the reader/writer 8 stops operation. In the above process, the voltage applied to the power terminal Vcc2 of the reader/writer 8 can be decreased to the given voltage that the reader/writer 8 stops operation within a given time period, which is shorter than a time that the reader/writer 8 may start to operate erroneously.

In contrast, if the voltage detected by the A/D converter 84 is maintained at the reference voltage value V2 or more (step S107: No), the process goes back to step S104, and repeats the process to step S106.

A description is given of a method of determining a capacitance of capacitor 33. The capacitance of capacitor 33 is determined to a given value so that the voltage supplied by the capacitor 33 (auxiliary power source) can be decreased within the upper limit of fall time set for the voltage applied to the power terminal Vcc2.

Under the state using the normal rating voltage V1 of the internal power source Vcc, the reference voltage value V2 of the internal power source Vcc, the operating guarantee voltage V3 of the reader/writer 8 (minimum voltage value for guaranteed operation), and the capacitance C of the capacitor 33, the voltage applied to the power terminal Vcc2 of the reader/writer 8 can be computed as follows when the internal power source Vcc falls below the reference voltage value V2 and the first switch 34 is set at the OFF state.

When the impedance of the reader/writer 8 with respect to the terminal of the capacitor 33 is set as an impedance R1 (pure resistance), the terminal voltage of the capacitor 33, that is the voltage applied to the power terminal Vcc2 of the reader/writer 8, can be expressed by the following formula (1) as vcc2.

$$vcc2 = V2 \cdot \exp(-t/C \cdot 1/R1) = V2 \cdot \exp(-t/(C \cdot R1)) \quad (1)$$

As can be understood from the formula (1), the vcc2 at the power terminal Vcc2 can be decreased in line with a time constant (C·R1), defined by the capacitance C of capacitor 33 and the impedance R1 of the reader/writer 8 with respect to the terminal of the capacitor 33, in which "t" is an elapsing time after the first switch 34 is set at the OFF state.

When a time required to write information to the IC tags 71, 72, 73, 74 by the reader/writer 8 is set as the time "tw," the capacitance Cu required for the capacitor 33 can be expressed by the following formula (2) using the operating guarantee voltage V3 of the reader/writer 8 (minimum voltage value for guaranteed operation), in which log means natural logarithm.

$$Cu \leq tw/(R1(\log(V2/V3)) \quad (2)$$

Upon writing information to the IC tags 71, 72, 73, 74 by using the reader/writer 8, the first switch 34 is set at the ON state. Then, the voltage applied vcc2x to the power terminal Vcc2 of reader/writer 8 can be computed as follows. Under the state that the terminal voltage of the capacitor 33 when the first switch 34 is set at the ON state is set as a voltage V4, the impedance of electrical circuit other than the reader/writer 8 with respect to the terminal of the capacitor 33 is defined as an impedance R2 (pure resistance), the voltage vcc2x applied to the power terminal Vcc2 can be expressed by the following formula (3).

$$vcc2x = V4 \cdot \exp(-t/C \cdot (1/R1 + 1/R2)) \quad (3)$$

When the formulas (1) and (3) are compared, the multiplier coefficient of time "t" in the formula (3), which is (1/R1+1/R2), is greater than the multiplier coefficient of time "t" in the formula (1), which is 1/R1, for a value of "1/R2". Therefore, the voltage vcc2x applied to the power terminal Vcc2 after the first switch 34 is set at the ON state can decrease faster than the voltage vcc2 applied to the power terminal Vcc2 which is before the first switch 34 is set at the ON state. Therefore, the voltage vcc2x can be decreased within the upper limit of fall time for the voltage applied to the power terminal Vcc2 of the reader/writer 8. For example, if the upper limit of fall time of the reader/writer 8, referred to as "td," is defined by the time duration when the power voltage decreases from the operating guarantee voltage V3 of the reader/writer 8 (minimum voltage value for guaranteed operation) to a level of V3/10, the capacitance Cd of capacitor 33, which can set the upper limit of fall time "td" of the reader/writer 8(1) at a value that does not cause malfunction such an error operation, can be expressed by the following formula (4) based on the formula (3).

$$Cd \leq td \cdot (1/R1 + 1/R2)/\log 10 \quad (4)$$

With such definitions, the range of capacitance C at which the capacitor 33 needs to be set can be found by the following formula (5).

$$Cd \leq C \leq Cu \quad (5)$$

Figure 4:
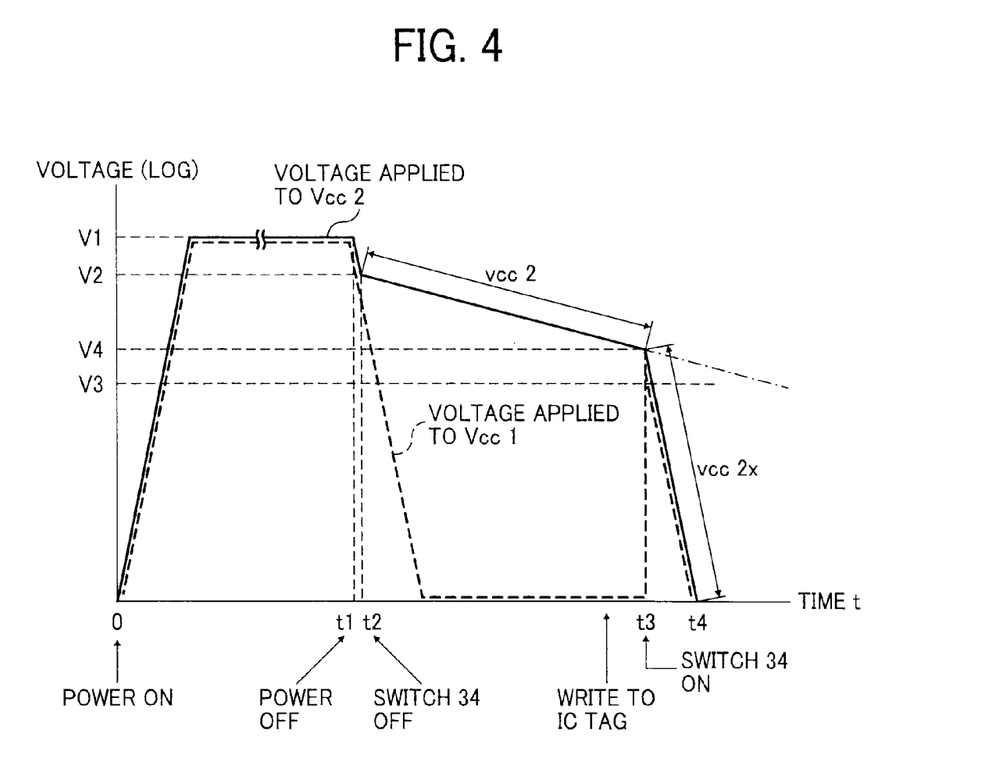
FIG. 4 shows example profiles of voltage, applied to a terminal of reader/writer of the image forming apparatus changing in the timeline, according to the first example embodiment.

With reference to FIG. 4, a description is now given of an example profile of the voltage applied to the power terminal Vcc2 of the reader/writer 8 in view of the timeline from the time that the power supply is set ON to the image forming apparatus 1 until the time of completion of operation of the reader/writer 8 after the power supply to the image forming apparatus 1 is set to the OFF state.

FIG. 4 shows example profiles of the voltage applied to the power terminal Vcc1 of the communication control unit 31, and the voltage applied to the power terminal Vcc2 of the reader/writer 8 along the timeline. In FIG. 4, the vertical axis represents the logarithmic value of voltage, and the horizontal axis represents time. Further, a profile or pattern of voltage applied to the power terminal Vcc1 is shown by a broken line, and a profile of voltage applied to the power terminal Vcc2 is shown by a solid line in FIG. 4. A description of the profile of the voltage of the power terminal Vcc1 and the voltage of power terminal Vcc2 is given by segmenting the time line as follows.

(Time t: From 0 to t1)

At the time t=0, the power supply to the image forming apparatus 1 is set to the ON state, then the voltage of the internal power source Vcc increases, in which the voltage of the power terminal Vcc1 and the voltage of the power terminal Vcc2 increase at the same speed, then reach the normal rating voltage V1, and a normal operation of the image forming apparatus 1 can be started.

(Time t: From t1 to t2)

When the power source for the image forming apparatus 1 is shut down at the time t=t1, both the voltage of the power terminal Vcc1 and the voltage of the power terminal Vcc2 decrease at the same speed along with the decrease of voltage of the internal power source Vcc. During such voltage decrease, the RW control unit 81 of the reader/writer 8 monitors or detects the voltage of the internal power source Vcc using the A/D converter 84. When the detected voltage falls below the reference voltage value V2 at the time t=t2, the first switch 34 is set at the OFF state using the first I/O port 85. (Time t: From t2 to t3)

The voltage of power terminal Vcc1 of communication control unit 31 decreases as the voltage of internal power source Vcc decreases, and then the communication control unit 31 stops operation. By setting the first switch 34 at the OFF state at the time t=t2, the charges of the capacitor 33 can be discharged only to the reader/writer 8 as above described, and the voltage applied to the power terminal Vcc2 of the reader/writer 8 decreases in line with the time constant (C·R1) defined by the capacitance C of capacitor 33 and the impedance R1 of the reader/writer 8 with respect to the terminal of the capacitor 33. By setting the capacitance C of capacitor 33 using the above-described formulas, the time required for writing data to the IC tags 71, 72, 73, 74 by the reader/writer 8 can be secured.
(Time t: From t3 to t4)

After completing the data writing to the IC tags 71, 72, 73, 74 using the RW control unit 81, the RW control unit 81 stops the voltage output to the first I/O port 85, by which the first switch 34 is returned to the ON state at the time "t=t3." Then, the voltage applied to the power terminal Vcc1 of communication control unit 31 may be increased to a same voltage applied to the power terminal Vcc2. Further, the charge of capacitor 33 can be discharged to the communication control unit 31 of the controller 3 and other units such as the electrical circuit load 32, by which the discharge speed of capacitor 33 can be increased, and the voltage-decrease speed at the power terminal Vcc2 can also be increased. Specifically, both of the voltage-decrease speed of the power terminal Vcc2 of the reader/writer 8, and the voltage-decrease speed of the power terminal Vcc1 of the communication control unit 31 can be increased, and the voltage of the power terminal Vcc2 and the voltage of the power terminal Vcc1 can be rapidly decreased below the operating guarantee voltage V3 of the reader/writer 8 (minimum voltage value for guaranteed operation). As such, in the above described first example embodiment, by setting the capacitance C of the capacitor 33 as expressed by the above formula (5), the upper limit of fall time of the reader/writer 8 can be satisfied, an and occurring of error processing by the reader/writer 8 can be prevented.

Second Example Embodiment

Figure 2B:
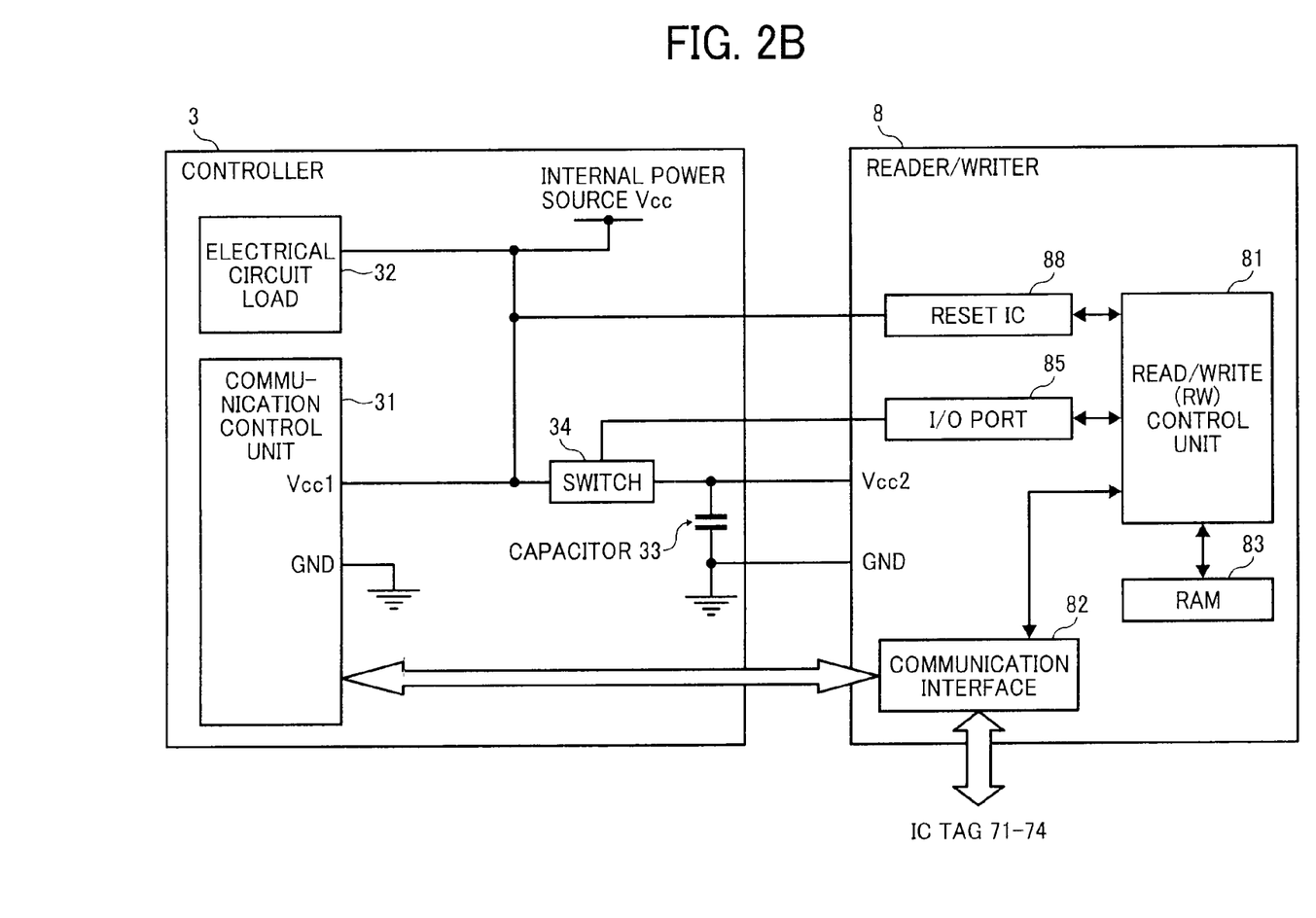
FIG. 2B shows an example block diagram of control system and reader/writer employed for the image forming apparatus according to a second example embodiment.

A description is now given of the image forming apparatus 1 according to a second example embodiment. The image forming apparatus 1 according to the second example embodiment may use a reset integrated circuit (IC) 88 as shown in FIG. 2B instead of the A/D converter 84 used in the image forming apparatus 1 of the first example embodiment. For example, the reset IC can output a high voltage when the voltage value of a power source is at a given value or more, or output a low voltage when the voltage value of a power source falls below a given value. Such output signal from the reset IC 88 can be used as an interruption signal of the RW control unit 81 to detect a decrease of the internal power source Vcc.

In the second example embodiment, the RW control unit 81 does not need to read the voltage value data from the A/D converter 84, and does not need to compare the read voltage value and the reference voltage value, by which the voltage decrease of power source can be detected promptly.

Third Example Embodiment

A description is now given of an image forming apparatus according to a third example embodiment. As for the image forming apparatus 1 according to the first example embodiment, when the RW control unit 81 returns the first switch 34 at the ON state at step S110 in FIG. 3, the terminal voltage of the capacitor 33 may be applied to the power terminal Vcc1 of the communication control unit 31. In the third example embodiment, another switch is further disposed between the power terminal Vcc1 and the capacitor 33 to prevent such application of the terminal voltage of the capacitor 33 to the power terminal Vcc1 of the communication control unit 31.

In the first example embodiment, when the first switch 34 is returned to the ON state at step S110 (FIG. 3), the voltage applied to the power terminal Vcc1 of communication control unit 31 may become a same voltage applied to the power terminal Vcc2 of the reader/writer 8. Therefore, from the time t3 to t4 shown in FIG. 4, the voltage applied to the power terminal Vcc1 of the communication control unit 31 may also become the operating guarantee voltage V3 of the reader/writer 8 (minimum voltage value for guaranteed operation) or more. Accordingly, for example, if the operation guarantee voltage of the communication control unit 31 is set to a value smaller than the operation guarantee voltage V3 of the reader/writer 8, the communication control unit 31 may restart operation when the first switch 34 is retuned to the ON state, by which malfunction may occur at the communication control unit 31.

In view of such situation, in the third example embodiment, by disposing another switch between the power terminal Vcc1 of the communication control unit 31 and the capacitor 33, the power terminal Vcc1 of the communication control unit 31 can be maintained at the electric current not-supplied state, by which occurring of error processing by the communication control unit 31 can be prevented.

Figure 5:
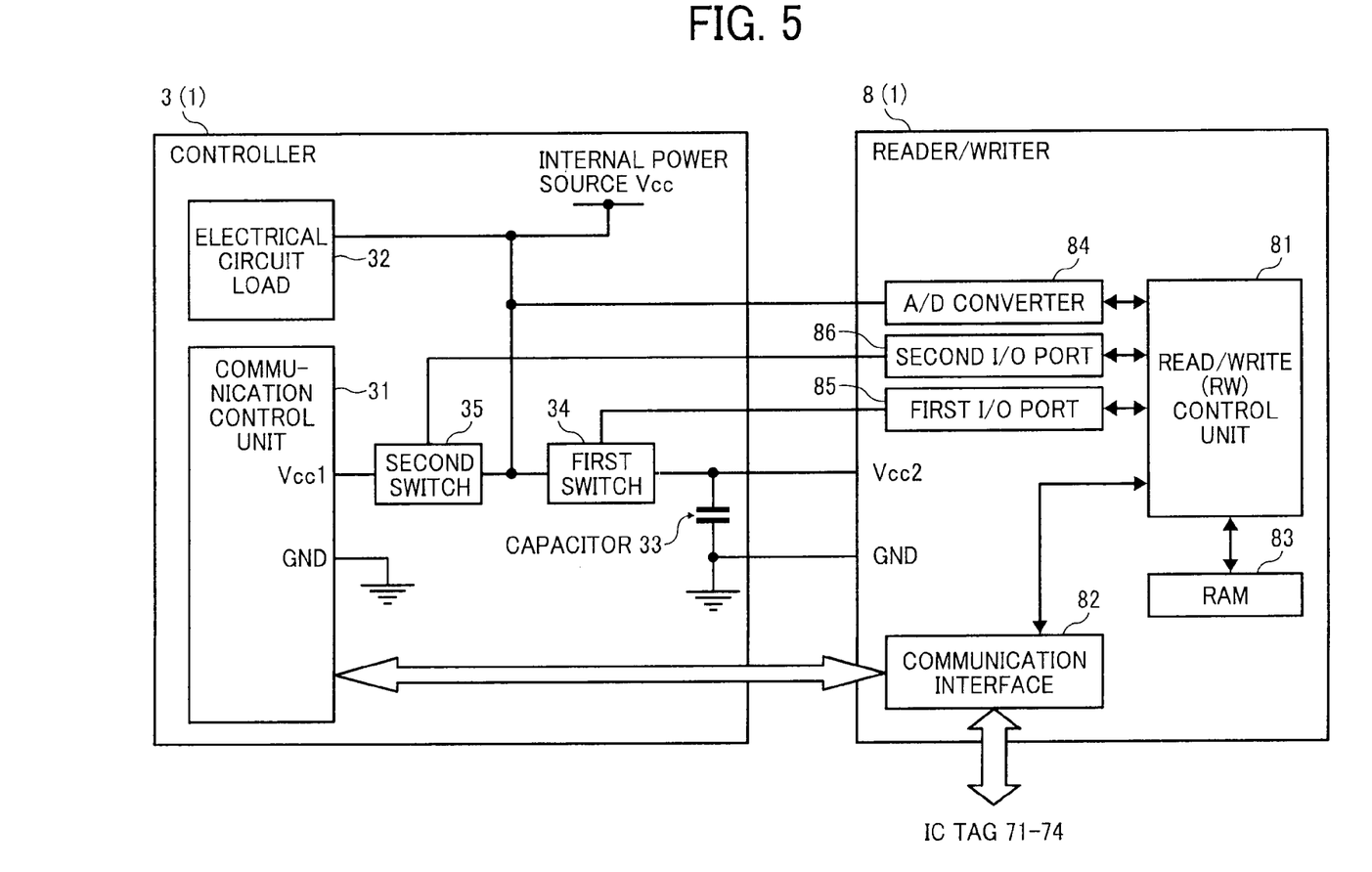
FIG. 5 shows an example block diagram of control system and a reader/writer employed for image forming apparatus according to a third example embodiment.

FIG. 5 shows an example configuration of a controller 3(1) and a reader/writer 8(1) of the image forming apparatus 1 according to the third example embodiment. As shown in FIG. 5, a second switch 35 is disposed between the first switch 34 and the power terminal Vcc1 in the controller 3(1), and the reader/writer 8(1) includes an I/O port 86, which may be used as a second I/O port 86. Other units are same as the controller 3 and the reader/writer 8 of the image forming apparatus 1 according to the first example embodiment (see FIG. 2A).

The second switch 35 may be a normally-OFF type, in which the second switch 35 is at the OFF state when electric current is not supplied from the second I/O port 86 of the reader/writer 8(1) to the second switch 35, and the second switch 35 is set at the ON state when electric current is supplied from the second I/O port 86 of the reader/writer 8(1) to the second switch 35.

The communication control unit 31 can be used as a transmission unit to transmit information indicating states of the image forming apparatus 1 to the RW control unit 81 used as the information writing processor. Further, the second switch 35, the second I/O port 86, and the RW control unit 81 may be configured as a current supply limiter to regulate electric current supply from the capacitor 33 (auxiliary power source) to the communication control unit 31 (transmission unit) via the first switch 34 (discharge controller).

As for the controller 3(1) and the reader/writer 8(1), after the power supply to the image forming apparatus 1 is set to the ON state, the RW control unit 81 of the reader/writer 8(1) can supply electric current to the second switch 35 via the second I/O port 86 so that the second switch 35 is set at the ON state. With such a configuration, the internal power source Vcc can be supplied to the power terminal Vcc1 of the communication control unit 31, and then the communication control unit 31 can start operation.

Then, when the power source supply to the image forming apparatus 1 is shut down, and the voltage of the internal power source Vcc decreases, the RW control unit 81 sets the first switch 34 to the OFF state, and writes data to at least one of the IC tags 71, 72, 73, 74. Then, when the voltage value of internal power source Vcc decreases to a voltage value that the communication control unit 31 stops operation completely, the voltage output of the second I/O port 86 is stopped to set the second switch 35 at the OFF state, and then the voltage output of the first I/O port 85 is stopped to return the first switch 34 at the ON state.

With such a configuration, the electric current supply between the capacitor 33 and the communication control unit 31 can be disconnected, and the power terminal Vcc1 of the communication control unit 31 can be maintained at the electric current not-supplied state, by which malfunction of the communication control unit 31 can be prevented.

Further, after the first switch 34 is set at the ON state, the capacitor 33 and the electrical circuit load 32 can be connected to each other, by which the charges of the capacitor 33 can be also discharged to the electrical circuit load 32, and thereby the terminal voltage of the capacitor 33 can be rapidly decreased, in which the capacitance C of the capacitor 33 is set to a given value so that the upper limit of fall time of the reader/writer 8(1) can be set to a value that does not cause malfunction.

Figure 6A:
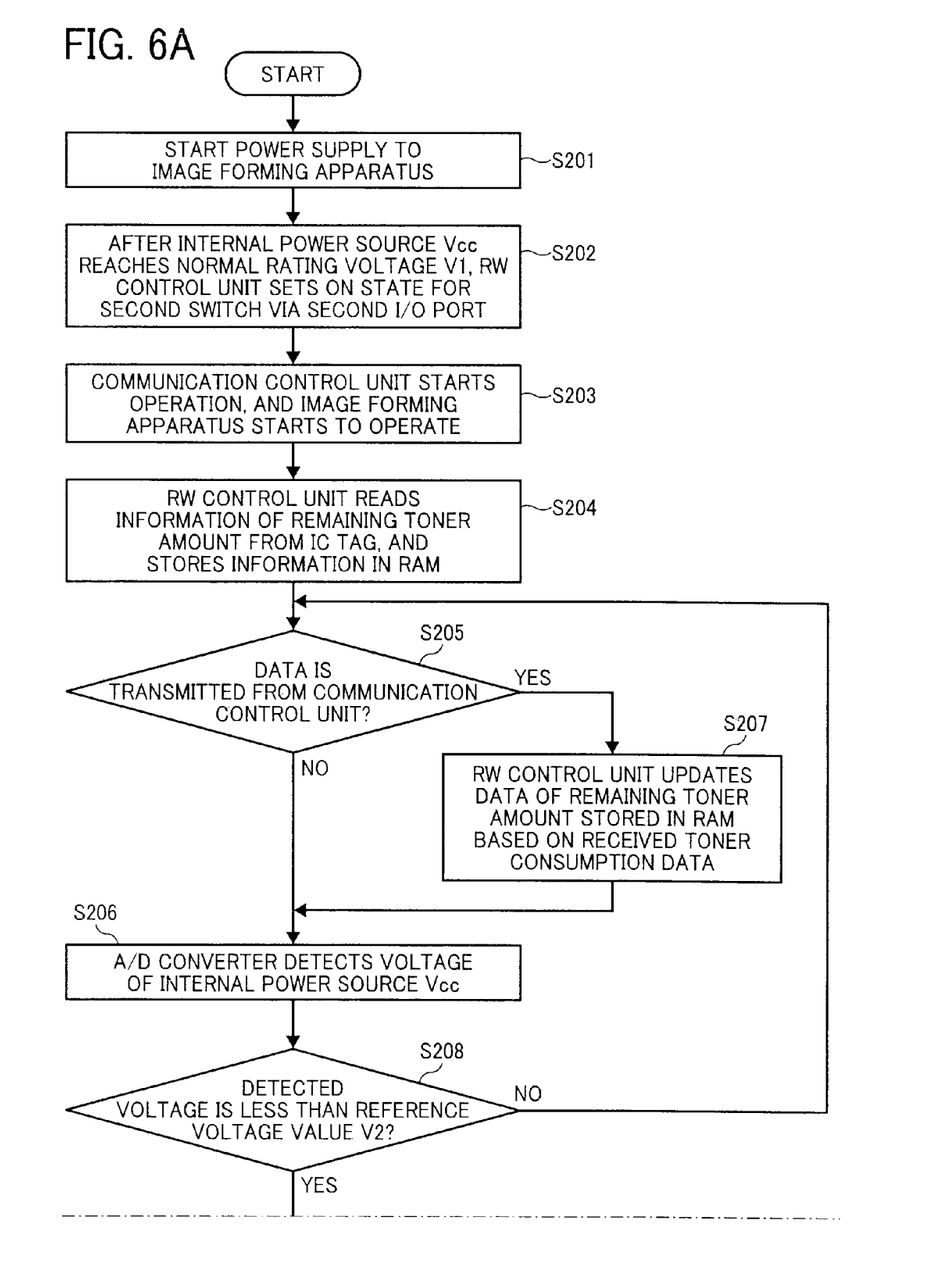
FIGS. 6A and 6B show a flowchart of reader/writer operation of image forming apparatus according to the third example embodiment.
Figure 6B:
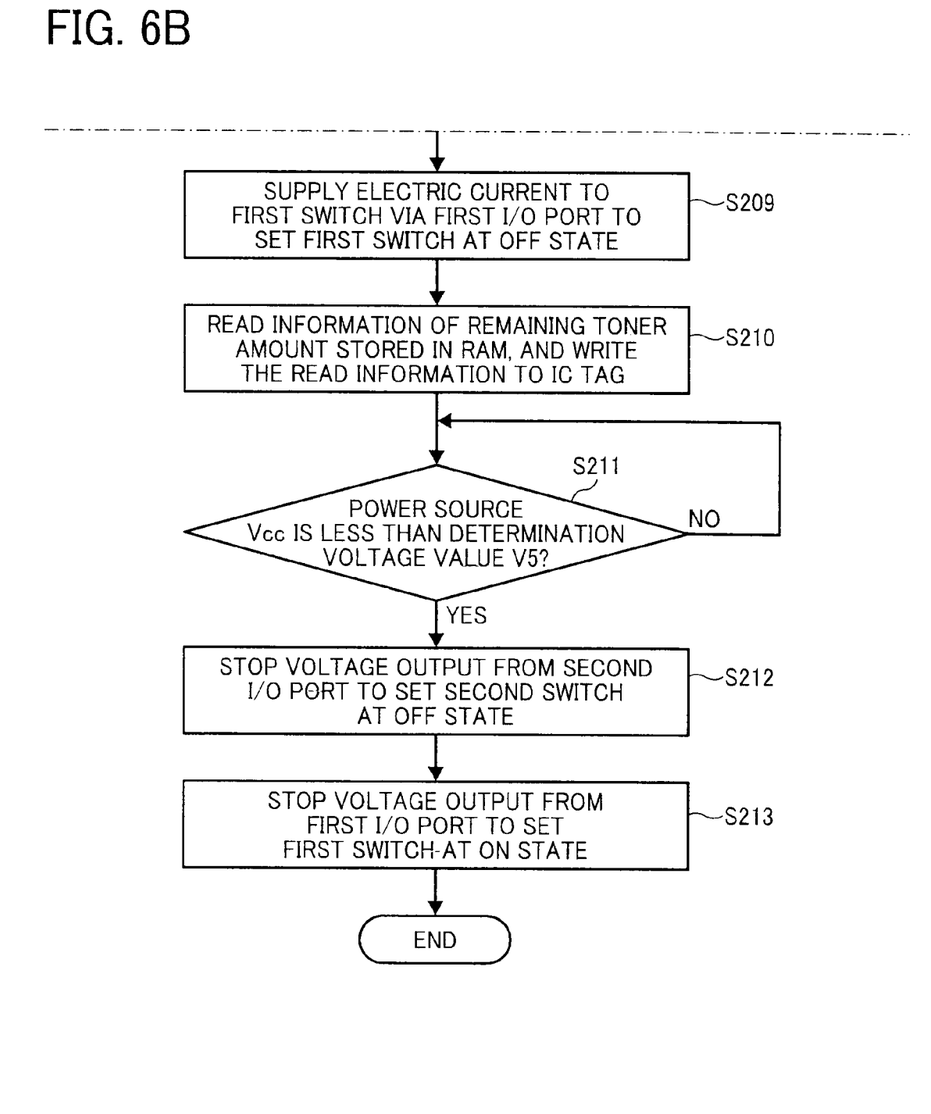

A description is given of an operation of the reader/writer 8(1) of the image forming apparatus 1 according to the third example embodiment with reference to FIGS. 6A and 6B, which show a flowchart of operation of the reader/writer 8(1). At first, the power is supplied to the image forming apparatus 1, for example, when a user sets power ON for the image forming apparatus 1 (step S201). After the power supply is set ON, the voltage of internal power source Vcc gradually increases and reaches to the normal rating voltage V1, and the RW control unit 81 of the reader/writer 8(1) sets the second switch 35 at the ON state via the second I/O port 86 (step S202). With such configuration, the communication control unit 31 can start operation and the image forming apparatus 1 can start to operation (step S203).

Steps S204 to S210, which are to be conducted after the image forming apparatus 1 starts to operate, are respectively same as steps S103 to S109 of FIG. 3 according to the first example embodiment.

After writing data to the IC tags 71, 72, 73, 74 at step S210, the RW control unit 81 waits until the voltage applied to the power terminal Vcc1 of the communication control unit 31, that is the internal power source Vcc, falls below a given determination voltage value V5. If the power terminal Vcc1 of the communication control unit 31 is maintained at the determination voltage value V5 or more, the process goes back (step S211: No).

When the internal power source Vcc falls below the determination voltage value V5 (step S211: Yes), the voltage output of the second I/O port 86 is stopped to set the second switch 35 at the OFF state (step S212). Then, the voltage output of the first I/O port 85 is stopped to return the first switch 34 at the ON state (step S213). The above mentioned determination voltage value V5 can be set to, for example, a voltage value that the communication control unit 31 completely stops operation.

As such, even if the first switch 34 is returned to the ON state at step 213, because the second switch 35 is already set at the OFF state, the terminal voltage of the capacitor 33 is not supplied to the power terminal Vcc1, by which the communication control unit 31 may not be operated by error, which means the error processing of the communication control unit 31 can be prevented.

Further, by setting the first switch 34 at the ON state at step 213, the charges of the capacitor 33 can be supplied to the electrical circuit load 32, by which the discharge speed of the capacitor 33 can be increased, and the voltage applied to the power terminal Vcc2 of the reader/writer 8(1) can be decreased within the upper limit of fall time for the voltage applied to the power terminal Vcc2 when the power OFF is set to the image forming apparatus 1, and thereby the error processing of the reader/writer 8(1) can be also prevented.

Figure 7:
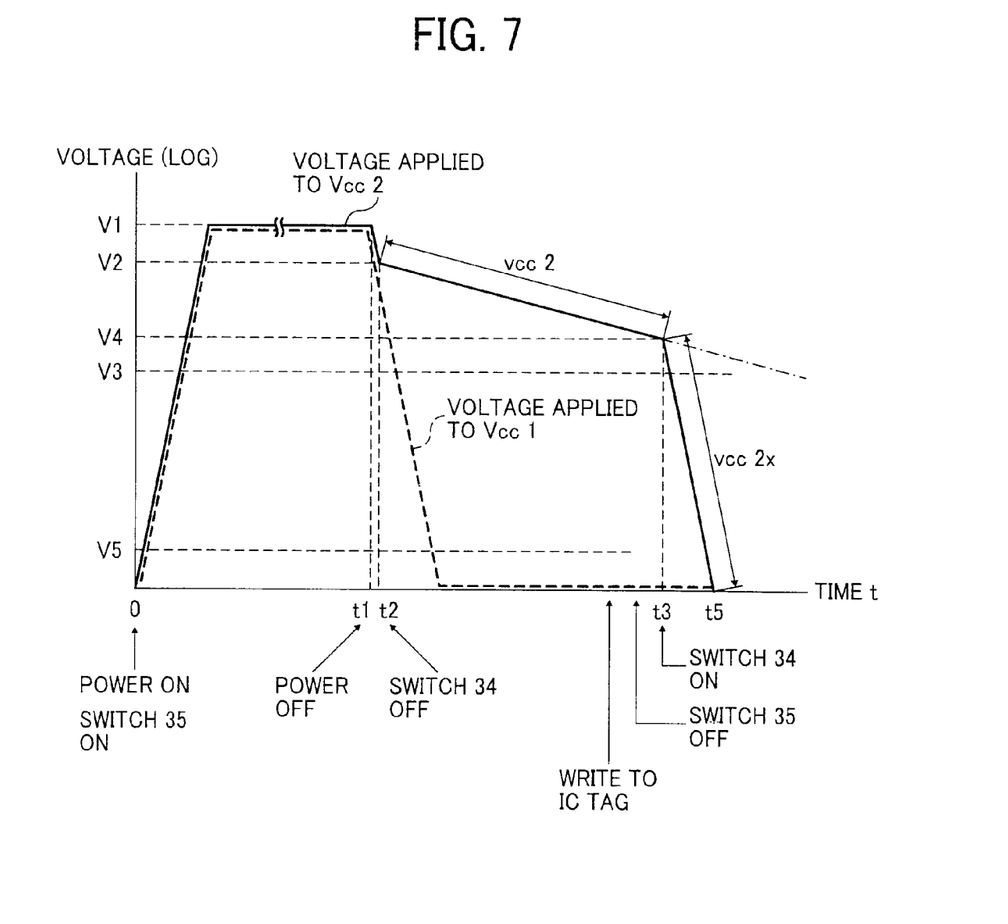
FIG. 7 shows example profiles of voltage, applied to a terminal of reader/writer of the image forming apparatus changing in the timeline, according to the third example embodiment.

With reference to FIG. 7, a description is given of an example profile of the voltage applied to the power terminal Vcc2 of the reader/writer 8(1) in view of the timeline from the time that the power supply is turned ON to the image forming apparatus 1 to the time of completion of operation of the reader/writer 8(1) after the power supply to the image forming apparatus 1 is set to the OFF state FIG. 7 shows example profiles of the voltage applied to the power terminal Vcc1 of the communication control unit 31, and the voltage applied to the power terminal Vcc2 of the reader/writer 8(1) along the timeline. In FIG. 7, the vertical axis represents the logarithmic value of voltage, and the horizontal axis represents time. Further, a profile of voltage applied to the power terminal Vcc1 is shown by a broken line, and a profile of voltage applied to the power terminal Vcc2 is shown by a solid line In FIG. 7.

In FIG. 7, the profile of the voltage applied to the power terminal Vcc1 and the voltage applied to the power terminal Vcc2 from the time "t=0" to just before the time "t=t3" are same as FIG. 4. After the time t=t2, data writing to the IC tags 71, 72, 73, 74 can be completed within a given time, and the second switch 35 is set at the OFF state. With such a configuration, the power terminal Vcc1 of the communication control unit 31 can be disconnected from the capacitor 33, and thereby even if the first switch 34 is returned to the ON state at the time "t=t3," the power terminal Vcc1 of the communication control unit 31 can be maintained at the electric current not-supplied state, by which the error processing of the communication control unit 31 may not occur.

As above described, in the image forming apparatus according to the first to third example embodiments, the discharge speed of the capacitor 33 used as the auxiliary power source can be controlled using the first switch 34, and the power voltage decreasing time of the capacitor 33 after the power supply to the image forming apparatus 1 is set to the OFF state can be set within the upper limit of fall time for the reader/writer 8 when the power OFF state is set for the image forming apparatus 1, by which an occurrence of error processing when writing data to the IC tag when the power supply to the image forming apparatus 1 is set to the OFF state can be prevented.

Although the above example embodiment describes the process of writing data (e.g., toner amount such as remaining toner amount) to the non-volatile memory (e.g., IC tag) disposed for the image forming apparatus (e.g., copier), the disclosure of the present invention can be similarly applied to other information processing apparatuses, which need to store data to memories for conducting given processes, and the application fields of such information processing apparatus is not limited to any specific field.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to an example embodiment, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus, comprising:
an information storage to store information indicating a state of the information processing apparatus;
an information writing processor to write the information, indicating the state of the information processing apparatus, to the information storage;
a main power source to supply power to the information writing processor;
an auxiliary power source to supply power to the information writing processor;
a discharge controller to control a discharge speed of the auxiliary power source; and
a current supply limiter,
wherein when a voltage output of the main power source becomes a preset reference voltage value, the discharge controller switches a power source for supplying power to the information writing processor from the main power source to the auxiliary power source, and then after completing information writing to the information storage by using the information writing processor and the auxiliary power source, the discharge controller controls the discharge speed of the auxiliary power source to decrease a voltage output of the auxiliary power source to a given voltage within a given time period,
wherein the discharge controller controls electric current supply by the auxiliary power source to an electrical circuit other than the information writing processor to control the discharge speed of the auxiliary power source,
wherein when a voltage output of the main power source falls below the preset reference voltage value in a state in which the information writing processor is writing the information to the information storage, the discharge controller stops electric current supply from the auxiliary power source to the electrical circuit,
wherein when the information writing processor has completed writing the information to the information storage, the discharge controller resumes supply of electric current from the auxiliary power source to the electrical circuit,
wherein the electrical circuit includes a communication controller to communicate the information, indicating the state of the information processing apparatus, with the information writing processor,
wherein the current supply limiter is disposed between the discharge controller and the communication controller, to regulate electric current supply from the auxiliary power source to the communication controller through the discharge controller, and
wherein, in a state in which the discharge controller stops electric current supply from the auxiliary power source to the electrical circuit, the current supply limiter stops electric current supply from the auxiliary power source to the communication controller when a voltage supplied to the communication controller falls below a preset determination voltage value.

2. The information processing apparatus of claim 1, wherein the given voltage of the auxiliary power source is a voltage at which the information writing processor stops operation, and the given time of the auxiliary power source is a time period shorter than a time period until the information writing processor starts to operate erroneously when the voltage output of the auxiliary power source is decreased.

3. The information processing apparatus of claim 1, wherein the information storage is a non-volatile memory.

4. The information processing apparatus of claim 3, wherein the non-volatile memory is an integrated circuit (IC) tag.

5. The information processing apparatus of claim 1, wherein the discharge controller includes a switching device.

6. The information processing apparatus of claim 5, wherein the switching device is a transistor.

7. The information processing apparatus of claim 1, wherein the current supply limiter includes a switching device.

8. The information processing apparatus of claim 7, wherein the switching device is a transistor.

9. The information processing apparatus of claim 1, wherein the auxiliary power source is a capacitor.

10. The information processing apparatus of claim 1, wherein the information processing apparatus is an image forming apparatus.

11. A method of controlling a power supply for an information processing apparatus employing a main power source and an auxiliary power source, the method comprising the steps of:
writing, by an information writing processor, information indicating a state of the information processing apparatus to an information storage for the information processing apparatus;
detecting a voltage output of the main power source supplying power for the writing of the information;
controlling, by a discharge controller, a discharge speed of the auxiliary power source supplying power for the writing of the information,
wherein when the voltage output of the main power source becomes a preset reference voltage value, the controlling step switches a power source for supplying power to the writing step from the main power source to the auxiliary power source, and then after completing the writing step using the auxiliary power source, the controlling step controls the discharge speed of the auxiliary power source to decrease a voltage output of the auxiliary power source to a given voltage within a given time period, wherein the controlling step controls electric current supply by the auxiliary power source to an electrical circuit other than the information writing processor to control the discharge speed of the auxiliary power source, wherein when a voltage output of the main power source falls below the preset reference voltage value in a state in which the writing step is writing the information to the information storage, the controlling step stops electric current supply from the auxiliary power source to the electrical circuit, and wherein when the writing step has completed writing the information to the information storage, the controlling step resumes supply of electric current from the auxiliary power source to the electrical circuit;

communicating, by a communication controller included in the electric circuit, the information, indicating the state of the information processing apparatus, with the information writing processor; and regulating, by a current supply limiter disposed between the discharge controller and the communication controller, electric current supply from the auxiliary power source to the communication controller through the discharge controller, wherein, in a state in which the controlling step stops electric current supply from the auxiliary power source to the electrical circuit, the regulating step stops electric current supply from the auxiliary power source to the communication controller when a voltage supplied to the communication controller falls below a preset determination voltage value.

12. A non-transitory computer-readable medium storing a program comprising instructions that when executed by a computer cause the computer to execute a method of controlling a power supply for an information processing apparatus employing a main power source and an auxiliary power source by executing the program, the method comprising the steps of:

writing, by an information writing processor, information indicating a state of the information processing apparatus to an information storage for the information processing apparatus;

detecting a voltage output of the main power source supplying power for the writing of the information;

controlling, by a discharge controller, a discharge speed of the auxiliary power source supplying power for the writing of the information, wherein when the voltage output of the main power source becomes a preset reference voltage value, the controlling step switches a power source for supplying power to the writing step from the main power source to the auxiliary power source, and then after completing the writing step using the auxiliary power source, the controlling step controls the discharge speed of the auxiliary power source to decrease a voltage output of the auxiliary power source to a given voltage within a given time, wherein the controlling step controls electric current supply by the auxiliary power source to an electrical circuit other than the information writing processor to control the discharge speed of the auxiliary power source, wherein when a voltage output of the main power source falls below the preset reference voltage value in a state in which the writing step is writing the information to the information storage, the controlling step stops electric current supply from the auxiliary power source to the electrical circuit, and wherein when the writing step has completed writing the information to the information storage, the controlling step resumes supply of electric current from the auxiliary power source to the electrical circuit;

communicating, by a communication controller included in the electric circuit, the information, indicating the state of the information processing apparatus, with the information writing processor; and regulating, by a current supply limiter disposed between the discharge controller and the communication controller, electric current supply from the auxiliary power source to the communication controller through the discharge controller, wherein, in a state in which the controlling step stops electric current supply from the auxiliary power source to the electrical circuit, the regulating step stops electric current supply from the auxiliary power source to the communication controller when a voltage supplied to the communication controller falls below a preset determination voltage value.

* * * * *